Figure 1:
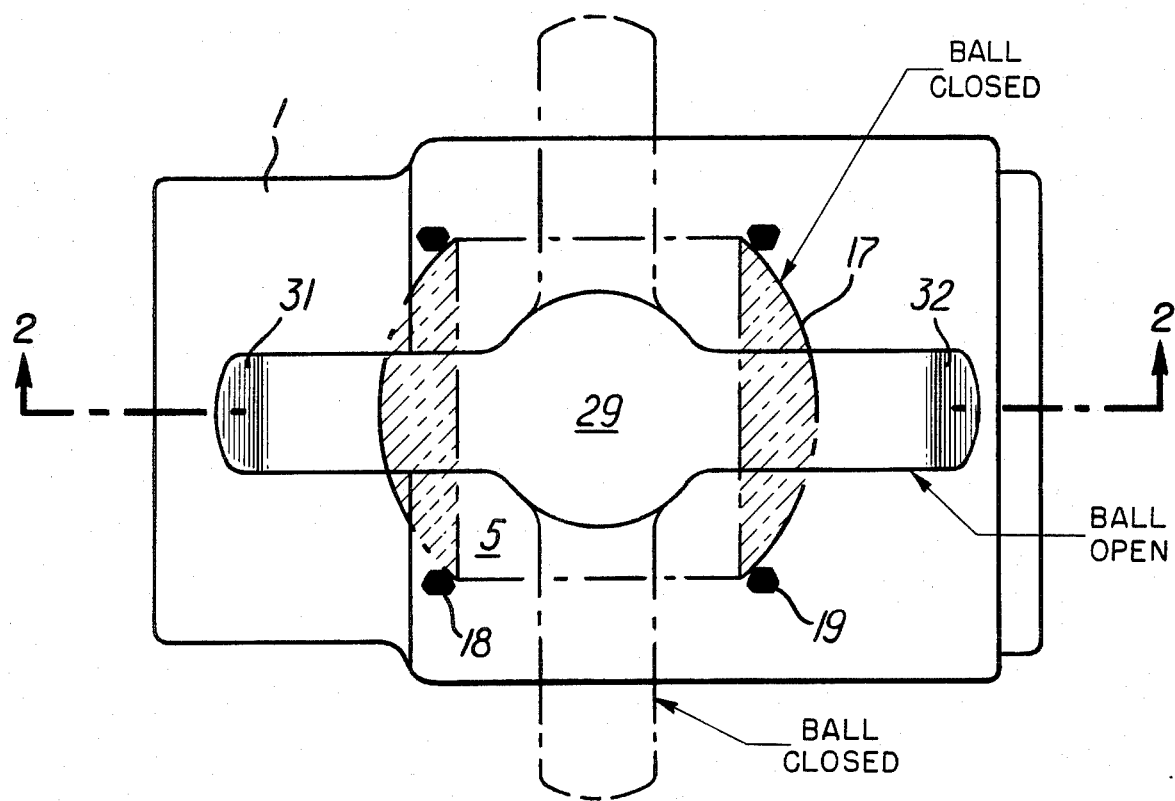

United States Patent [19]

Paitchell

[11] Patent Number: 4,523,740
[45] Date of Patent: Jun. 18, 1985

[54] ROTATABLE UNITARY BALL VALVE

[75] Inventor: Harold Paitchell, Elizabeth, N.J.

[73] Assignee: Hayward Industries, Elizabeth, N.J.

[21] Appl. No.: 484,385

[22] Filed: Apr. 12, 1983

Related U.S. Application Data

[63] Continuation of Ser. No. 307,411, Oct. 1, 1981, abandoned.

[51] Int. Cl.³ .............................................. F16K 27/06
[52] U.S. Cl. .................................. 251/315; 251/367; 285/21
[58] Field of Search ............... 251/315, 316, 317, 309, 251/305, 366, 367; 285/21; 156/293, 305, 155

[56] References Cited

U.S. PATENT DOCUMENTS

| | | | |
|---|---|---|---|
| 3,051,509 | 8/1962 | Wilton et al. | 285/21 |
| 3,228,652 | 1/1966 | Antrim | 251/315 |
| 3,394,916 | 7/1968 | Birr | 251/315 |
| 3,463,451 | 8/1969 | Treadwell | 251/315 |
| 3,970,285 | 7/1976 | Lonn | 251/315 |
| 4,072,161 | 2/1978 | Schoeneweis et al. | 251/315 |
| 4,175,590 | 11/1979 | Grandclement | 251/366 |
| 4,181,549 | 1/1980 | McPhee | 285/21 |
| 4,257,575 | 3/1981 | Runyan | 251/315 |

Primary Examiner—Martin P. Schwadron
Assistant Examiner—James R. Shay

[57] ABSTRACT

A rotatable unitary ball valve is provided, comprising, in combination:

(1) a unitary valve housing of plastic material defining a ball valve chamber, intercommunicating first and second fluid ports and first and second fluid passages, and a threaded end connector socket in one passage;

(2) an externally threaded end connector integral with the valve housing, permanently fixed in the end connector socket, and adapted for attachment to a fluid line; and the other fluid passage being adapted for attachment to a fluid line;

(3) a ball valve having a through fluid passage intercommunicating the first and second fluid passages of the valve housing only in the open position of the valve, and disposed in the valve chamber for rotation between open and closed positions; closing off intercommunication between the first and second fluid passages via the ball valve chamber and the ball valve through fluid passage in the closed position, and making such intercommunication in the open position;

(4) at least one sealing means sealingly disposed between the ball valve and the valve chamber wall, maintaining a fluid-tight seal therewith at least in the closed position of the valve; and (5) means extending to the outside of the valve housing for rotating the valve between open and closed positions.

11 Claims, 3 Drawing Figures

ROTATABLE UNITARY BALL VALVE

This is a continuation of application Ser. No. 307,411 filed Oct. 1, 1981, now abandoned.

Union valves are commonly provided for insertion in a fluid line, to control flow in either direction through the line. The term "union" refers to the capability of the valve of receiving one or two union nuts, for effecting the line connections. A true or double-union valve can receive such nuts on end connectors on each side of the valve, while a single union valve has an end connector receiving a union nut only at one end of the valve. The valve can accordingly be disconnected at the union downstream for maintenance or service, while still maintaining the upstream line closed. The valve is a plug or ball valve, usually manually operated. Retaining rings on one or both sides of the valve retain the valve seals in position, preventing seal blow-out.

Threaded connections are normally provided between the various valve parts, facilitating disassembly and reassembly, and in some designs take-up for wear as well. Threaded joints are however prone to loosen, particularly under conditions where the valve is subjected to vibration or mechanical stress, with resulting leaks and possible seal blow-out. Suggestions have been made of designs that deal with this problem, of which U.S. Pat. Nos. 3,540,693 to Wise, patented Nov. 17, 1970; 3,550,902 to Pidgeon and Vanegas, patented Dec. 29, 1970; 4,099,705 to Runyan, patented July 11, 1978; 4,023,773 to Wise, patented May 17, 1977; 4,103,865 to Nanba, Ueda and Matsuda, patented Aug. 1, 1978; and 4,124,036 to Rogers, patented Nov. 7, 1978, are exemplary.

Another approach is to eliminate all threaded joints or seals. Wrasman U.S. Pat. No. 3,961,770, patented June 8, 1976, describes a ball valve having a housing molded in place about a preformed rotary valve member. This kind of valve poses serious manufacturing problems, which are discussed in the Wrasman patent and in the prior U.S. patents referred to therein, U.S. Pat. Nos. 3,271,845 to Breher; 3,807,692 to Usab et al; 3,223,111 to Anderson, and 3,712,584 to Wise.

In accordance with the present invention, problems arising from molding such valves in situ with the valve already in place are avoided by utilizing a conventional threaded joint in initial assembly of the valve, and then after assembly integrating the abutting threadably connected components of the joint, thus fixing them in place, eliminating the joint, and forming a unitary valve body. The result is a unitary valve construction which has the advantages of the molded valve of Wrasman and others, but the manufacturing simplicity of a more conventional plug valve.

The rotatable unitary ball valve in accordance with the invention comprises, in combination:

(1) a unitary valve housing of plastic material defining a ball valve chamber, intercommunicating first and second fluid ports and first and second fluid passages, and a threaded end connector socket in one passage;

(2) an externally threaded end connector integral with the valve housing, permanently fixed in the end connector socket, and adapted for attachment to a fluid line; and the other fluid passage being adapted for attachment to a fluid line;

(3) a ball valve having a through fluid passage intercommunicating the first and second fluid passages of the valve housing only in the open position of the valve, and disposed in the valve chamber for rotation between open and closed positions; closing off intercommunication between the first and second fluid passages via the ball valve chamber and the ball valve through fluid passage in the closed position, and making such intercommunication in the open position;

(4) at least one sealing means sealingly disposed between the ball valve and the valve chamber wall, maintaining a fluid-tight seal therewith at least in the closed position of the valve; and (5) means extending to the outside of the valve housing for rotating the valve between open and closed positions.

The end connector socket and end connector are threadably interconnected so that the pressure appropriate to ensure sealing engagement of the sealing means between the ball valve and the ball valve chamber wall can be brought to bear before their integration. One of the problems of manufacture by molding all components in situ, as in U.S. Pat. No. 3,961,770, referred to above, is maintaining leak-tight sealing engagement of these components, but this is no problem when they are engaged in a threaded joint before integration.

For optimum bearing pressure adjustment, fine threads, i.e., threads with a low helix or thread angle, are preferably employed in the joint.

This allows the parts to be molded in a good integrated joint even if the tolerances between the parts exceed normal tolerance limitations.

The joint remains tight during integration, even with plastics that undergo large dimensional changes during molding, because the components are of the same plastic material, and are held in abutting contact by the threads.

The threaded joint also makes it possible to integrate materials that are not softenable by solvents, but are softenable by heat or by dielectric heating or by ultrasonic welding.

This construction lends itself to manufacture from plastics material of the thermoplastic or solvent-soluble type, including not only plastic materials that are permanently thermoplastic, but also plastic materials that can be cured or set to a nonthermoplastic or nonfusible condition after the necessary integration of the abutting threaded joint components has been effected.

When the plastic materials are thermoplastic, or in a thermoplastic stage of polymerization, the integration can be effected by ultrasonic welding or by application of heat to a temperature at which the plastic material is either softened sufficiently to become flowable, or sinterable, or even liquefied in the joint area, provided the liquefaction is restricted to that area, so that the external shape of the integrated configuration or component parts is not lost.

If the plastics material is soluble in water or an organic solvent, the integration can be effected by application of a solvent to the joint. The solvent will dissolve the plastics material of the two components, and form a mutual solution in that area. The mutual solution of the components will effect the necessary integration, which can be completed by evaporation of the solvent, either under reduced pressure, or upon application of heat, or both. The resulting integrated structure is indistinguishable in physical characteristics from an integrated structure formed by heating to a temperature at which the plastic is softened or liquefied.

If the plastic material is thermoplastic, the joint is completed by allowing the plastic material to harden, and return it to its original solid condition. If the material is to be heat-cured, the integrated material can be ultrasonically welded or heated by dielectric heating or in an oven at a temperature at which the polymerization of the plastics material is brought to a solvent-insoluble nonthermoplastic stage. In either case, the joined components are fixed in a permanent integration, in a unitary valve housing structure.

Plastics materials which can be used include thermoplastic materials, such as polyvinyl chloride, polyvinyl fluoride, polytetrafluoroethylene, copolymers of vinyl chloride and vinyl acetate, polyvinyl butyral, copolymers of vinyl chloride and vinylidene chloride, polyacrylic resins, polyamides, polyvinyl acetate, polyesters, polycarbonates, polypropylene, polyethylene, polyisobutylene, polyisopentylene, and polyisoprene, and thermosetting polymers such as phenol-formaldehyde, urea-formaldehyde, melamine-formaldehyde, polyesters, polyallyl resins, and cross-linked polyvinyl chloride, polyamides, polyimides and acrylic polymers.

Figure 2:
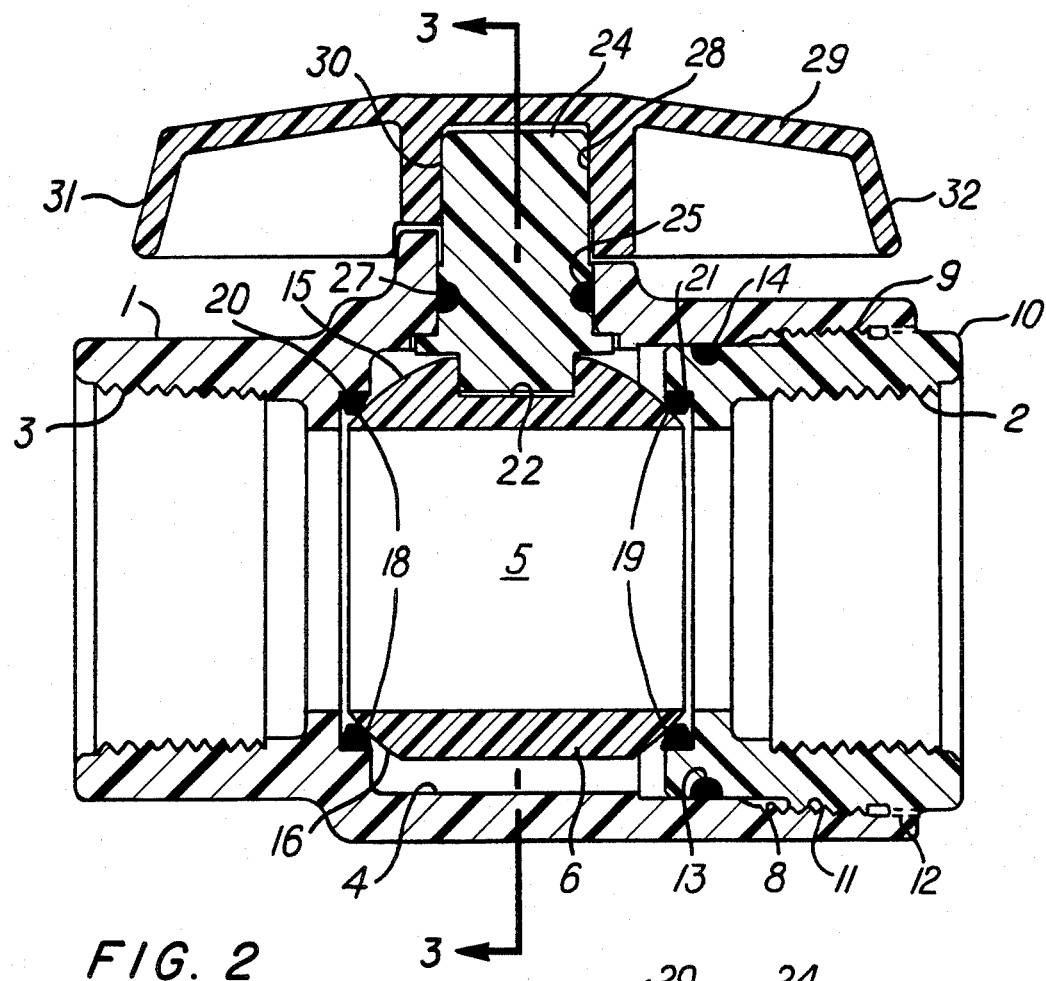
Figure 3:
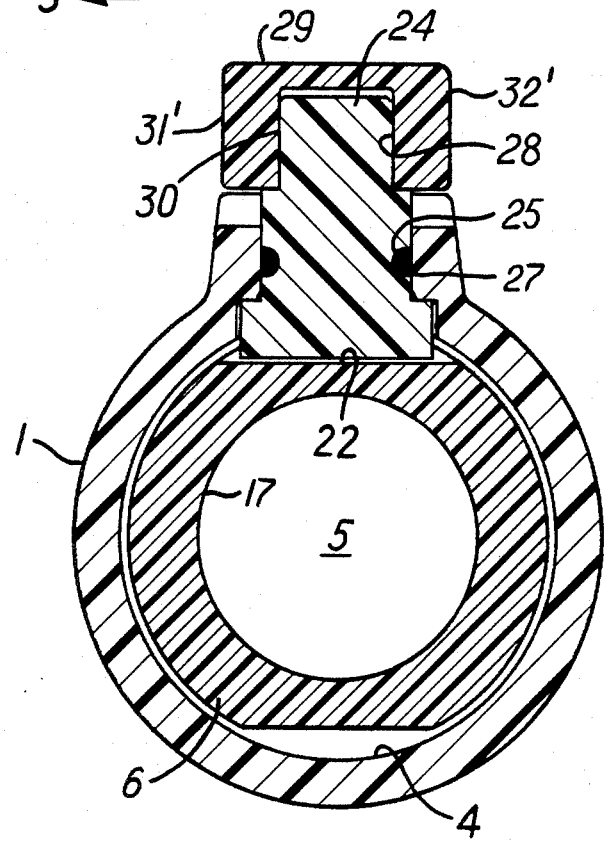

A preferred embodiment of the valve of the invention is shown in the drawings, in which:

FIG. 1 represents a top view of a valve of the invention;

FIG. 2 represents a longitudinal section through the valve of FIG. 1, taken along the line 2—2, looking into the through fluid passage through the valve with the ball valve in the open position; and FIG. 3 represents a cross-section through the valve of FIGS. 1 and 2, taken along the line 3—3 of FIG. 2, with the ball valve in the open position.

The valve of FIGS. 1 to 3 has a unitary valve body 1, in this case of polyvinyl chloride resin. There is a through fluid passage through the valve housing, composed of a first fluid port and fluid passage 2 and a second fluid port and fluid passage 3, intercommunicating via a valve chamber 4 and the through fluid passage 5 of the rotatable ball valve 6.

The fluid passage 2 defines an end connector socket 8 with internal threads 9, with an end connector 10, also formed of polyvinyl chloride, with external threads 11 threaded into the socket. These threads are shown in dashed lines, because in the valve shown, these threads have been integrated in assembly in the joint area 12 at the outer end of the joint by fusion integration of the end connector with the end connector socket wall of the valve housing, thus permanently attaching the end connector in the socket, retaining the ball valve 6 in the valve chamber 4, and forming a unitary valve.

Disposed in a peripheral recess 13 of the end connector 10 is an O-ring seal 14, of ethylene or propylene copolymer or any other elastomer or resilient polymer such as Viton A or polytetrafluoroethylene, but this seal can be omitted when the integration of the end connector with the valve housing forms a fluid-tight seal throughout the joint area 12.

The ball valve 6 has rounded ends 15, 16 and a spherical center portion 17, through which the transverse fluid passage 5 extends, interconnecting the fluid passage 2 and passage 3 when the valve is in the open position, as shown in FIG. 2. When the valve is rotated 90° into the closed position shown in FIG. 1, the through fluid passage 5 of the valve no longer interconnects the fluid passages 2 and 3, and therefore the valve is closed.

A leak-tight seal between the ball valve 6 and the walls of the valve chamber 4 on each side of the through passage 5 at the fluid passages 2 and 3 is ensured by the ring seals 18, 19, each of which is trapezoidal in cross-section, and made of polytetrafluoroethylene, Viton A, or other resilient elastomer. The ring seal 18 is confined in the circumferential recess 20 of the valve chamber 4, while the seal 19 is confined in the circumferential recess 21 at the inner end of the end connector 10.

It will thus be noted that the downstream ring seal 18 is held in place by the valve body 1, while the upstream ring seal 19 is held in position by the end connector 10, which is permanently fixed and integrated to the valve body at the joint area 12.

Since the seals are of polytetrafluoroethylene, and the valve ball is of polyvinyl chloride, the valve ball can be easily rotated through 90° between open and closed positions without breaking contact between the valve ball and the housing via the polytetrafluoroethylene rings 18, 19 in any intermediate position of the valve.

Fixedly attached to one end of the ball valve in the socket 22 is the valve stem 24. A peripheral recess 25 in the stem receives the sealing O-ring 27, also of polytetrafluoroethylene, ethylene propylene copolymer or other resilient elastomer, according to the fluid with which the valve is used, which ensures a fluid-tight seal between the stem and the valve stem passage 28 of the housing. A handle 29 is fixedly attached to portion 30 of the valve stem that projects beyond the housing, and makes it possible to rotate the valve ball manually, simply by grasping the finger grips 31, 32.

Since the grips of the handle are in alignment with the valve body and fluid line in the open position, the position of the handle itself shows the position of the valve. When the grips are in alignment with the valve body the valve is open, and when the grips are positioned transversely to the valve body, the valve is closed. If desired, the manual handle can be replaced by an automatic operator, such as by a pneumatic, mechanical or electrical operating means.

Assembly of the valve is quite simple. First the ring seal 18 is inserted through the open passage 2 of the valve housing and positioned in recess 20 in the valve chamber 4. Then, the valve stem 24 is inserted in the valve body through passage 2 into the stem passage 28. Then, the ball valve 6 is inserted in the valve chamber 4, engaging the valve stem in the slot 22 of the ball. The valve 6 then rests against the ring 18, with the valve stem 24 loosely engaged in the slot 22. This loose engagement permits self-centering of the ball in the valve seat. The handle 29 can then be attached to the outside 30 of the valve stem 24. The ring seals 14 and 19 are placed on the end connector 10, which then is threaded into the end connector socket 8 to proper torque for ensuring a leak-tight seal between the ball 6, the chamber wall and the seal 19, and tested for leakage. If a leak is detected, more torque is applied, so that a leak-tight seal after integration is ensured. Then, the threaded joint is obliterated throughout the area 12 by application of ultrasonic welding or heat or solvent, after which the integrated area is allowed to harden and/or cured if required, and the completed valve is then ready for use.

It will be noted that blow-out at the valve stem passage 28 is prevented by virtue of the flange 31 of the stem engaging on its upper face the inner end portion 32 of the valve chamber.

The end connector 10 and the fluid passage 3 are each provided with internal or external threads (not shown) for attachment to union nuts or other forms of line connectors with the fluid line in which the valve is inserted.

The valve housing has a stop 33 which engages the stop 34 on the handle 29, and thus restricts rotation of the valve to an arc of 90°, sufficient to define the open and closed positions of the ball valve 6.

The plastic construction of the valve and the absence of any metal parts ensures resistance to attack by chemicals such as acids, alkalis and other corrosive materials. If the plastic is of a nonthermoplastic nature, it will also be insensitive to temperature, up to the temperature of decomposition of the plastic material. The integrated construction prevents blow-out. Because the valve is constructed of inexpensive materials, and is simple in design and inexpensive to manufacture, when a defect arises or undue wear occurs, the valve simply is removed from the line and discarded. There are accordingly no maintenance problems, while a long life and reliable operation are ensured.

Having regard to the foregoing disclosure, the following is claimed as the patentable and inventive embodiments thereof:

1. A rotatable unitary ball valve comprising, in combination:
 (1) a unitary valve housing of plastic material defining a ball valve chamber, intercommunicating first and second fluid ports and first and second fluid passages, and a threaded end connector socket in one passage;
 (2) an externally threaded end connector threadably engaged in the threaded end connector socket and permanently fixed therein by fused integration of the threads thereof with the valve housing and adapted for attachment to a fluid line; and the other fluid passage being adapted for attachment to a fluid line;
 (3) a ball valve having a through fluid passage intercommunicating the first and second fluid passages of the valve housing only in the open position of the valve, and disposed in the valve chamber for rotation between open and closed positions; closing off intercommunication between the first and second fluid passages via the ball valve chamber and the ball valve through fluid passages in the closed position, and making such intercommunication in the open position;
 (4) at least one sealing means sealingly disposed between the ball valve and the valve chamber wall, maintining a fluid-tight seal therewith at least in the closed position of the valve; and
 (5) means extending to the outside of the valve housing for rotating the valve between open and closed positions.

2. A rotatable unitary ball valve according to claim 1 in which the valve housing and end connector are of thermoplastic or solvent-soluble plastic material.

3. A rotatable unitary ball valve according to claim 2 in which the plastic material is thermoplastic.

4. A rotatable unitary ball valve according to claim 2 in which the plastic material is in a nonthermoplastic stage of polymerization.

5. A rotatable unitary ball valve according to claim 2 in which the plastic material is selected from the group consisting of polyvinyl chloride, polyvinyl fluoride, copolymers of vinyl chloride and vinyl acetate, polyvinyl butyral, copolymers of vinyl chloride and vinylidene chloride, polyacrylic resins, polyamides, polyvinyl acetate, polyesters, polycarbonates, polypropylene, polyethylene, polyisobutylene, polyisopentylene, polyisoprene, phenol-formaldehyde, urea-formaldehyde, melamine-formaldehyde, polyesters, polyallyl resins, and cross-linked polyvinyl chloride, polyamide, polyimide, and acrylic polymers.

6. A rotatable unitary ball valve according to claim 1 in which the sealing means between the ball valve and the walls of the valve chamber are disposed on each side of the valve through passage at the first and second fluid passages.

7. A rotatable unitary ball valve according to claim 6 in which the sealing means are two ring seals, of which one is confined in a circumferential recess in a wall of the valve chamber and the other is confined in a circumferential recess at the inner end of the end counter.

8. A rotatable unitary ball valve according to claim 7 in which the one ring seal is downstream of the valve, while the other ring seal is upstream of the valve.

9. A rotatable unitary ball valve according to claim 7 in which the ring seals are of polytetrafluoroethylene, and the valve ball is of polyvinyl chloride.

10. A rotatable unitary ball valve according to claim 1 which the means for rotating the ball valve is a valve stem fixedly attached to one end of the ball valve extending through a valve stem passage of the housing, and having a handle fixedly attached to a portion of the valve stem that projects beyond the housing, the handle having finger grips for manual rotation of the valve ball.

11. A rotatable unitary ball valve according to claim 10 in which the grips of the handle are in alignment with the valve body and fluid line in the open position of the valve, and transverse to the valve body and fluid lline in the closed position of the valve.

* * * * *